US012188598B2

(12) United States Patent
Ferroni et al.

(10) Patent No.: US 12,188,598 B2
(45) Date of Patent: Jan. 7, 2025

(54) CONNECTION UNITS FOR QUICK CONNECTION/DISCONNECTION FLUIDIC LINES

(71) Applicant: Thales Alenia Space Italia S.p.A. Con Unico Socio, Rome (IT)

(72) Inventors: Stefano Ferroni, Turin (IT); Antonia Simone, Turin (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 0 days.

(21) Appl. No.: 18/013,845

(22) PCT Filed: Jul. 2, 2021

(86) PCT No.: PCT/IB2021/055970
§ 371 (c)(1),
(2) Date: Dec. 29, 2022

(87) PCT Pub. No.: WO2022/003648
PCT Pub. Date: Jan. 6, 2022

(65) Prior Publication Data
US 2023/0288003 A1 Sep. 14, 2023

(30) Foreign Application Priority Data

Jul. 3, 2020 (EP) .................................... 20184051
Sep. 23, 2020 (IT) ........................ 102020000022447

(51) Int. Cl.
*F16L 37/36* (2006.01)
*F16L 37/096* (2006.01)
(Continued)

(52) U.S. Cl.
CPC ............. *F16L 37/36* (2013.01); *F16L 37/096* (2013.01); *F16L 37/107* (2013.01);
(Continued)

(58) Field of Classification Search
CPC . F16L 37/36; F16L 37/32; F16L 37/30; F16L 37/35; F16L 37/34; F16L 37/107;
(Continued)

(56) References Cited

U.S. PATENT DOCUMENTS 2,393,489 A * 1/1946 Trautman ................ F16L 37/35
137/614.02
2,457,251 A * 12/1948 Main, Jr. ................. F16L 37/34
137/614.04
(Continued)

FOREIGN PATENT DOCUMENTS

GB 607340 A 8/1948
KR 20200019347 A 2/2020

OTHER PUBLICATIONS

PCT International Search Report and Written Opinion dated Oct. 21, 2021 for PCT Application No. PCT/IB2021/055970.
PCT/IB2021/054601, May 26, 2021, WO 2021/240404 A1.

*Primary Examiner* — David Colon-Morales
(74) *Attorney, Agent, or Firm* — McCarter & English, LLP

(57) ABSTRACT

A connection unit comprising two female connectors configured to be connected to respective circuit branches of a fluidic line and a coupling element for coupling the connectors together and establish a fluidic connection between the circuit branches, wherein the connectors are provided with first, normally closed sealing elements to define a sealing termination of the circuit branches when the connectors are disconnected from each other; the coupling element includes a double-male connector separable from the female connectors and provided with a pair of shanks that can be coupled to the respective female connectors and a control element movable between a first position where the coupling element can be coupled to the connectors in a mechanical pre-coupling condition without fluidic connection between the (Continued)

female connectors and a second position where the shanks of the double-male connector engage the respective female connectors and establish a fluidic connection therebetween.

13 Claims, 6 Drawing Sheets

(51) Int. Cl.
    *F16L 37/107* (2006.01)
    *F16L 37/113* (2006.01)
    *F16L 37/32* (2006.01)
    *F16L 37/35* (2006.01)

(52) U.S. Cl.
    CPC ............. *F16L 37/113* (2013.01); *F16L 37/32* (2013.01); *F16L 37/35* (2013.01); *F16L 2201/10* (2013.01); *F16L 2201/20* (2013.01); *F16L 2201/60* (2013.01)

(58) Field of Classification Search
    CPC ... F16L 37/096; F16L 37/113; F16L 2201/60; F16L 2201/10; F16L 2201/20
    See application file for complete search history.

(56) References Cited

U.S. PATENT DOCUMENTS

| | | | | |
|---|---|---|---|---|
| 2,509,444 | A | | 5/1950 | Mitchell |
| 2,625,410 | A | * | 1/1953 | Crowley ............... F16L 37/107 137/614 |
| 2,687,314 | A | * | 8/1954 | Kaiser .................. F16L 37/32 137/614.02 |
| 2,934,359 | A | * | 4/1960 | Smisko ................. F16L 37/35 285/308 |
| 3,120,968 | A | * | 2/1964 | Calvin .................. F16L 37/34 285/321 |
| 3,167,092 | A | | 1/1965 | Kelly et al. |
| 3,217,746 | A | * | 11/1965 | Voisine ................. F16L 37/107 285/361 |
| 3,474,827 | A | * | 10/1969 | Rosell ................... F16L 37/36 137/614.03 |
| 3,664,634 | A | * | 5/1972 | Guertin ................. F16L 37/36 251/333 |
| 4,211,439 | A | * | 7/1980 | Moldestad ............ F16L 37/113 285/376 |
| 4,271,865 | A | * | 6/1981 | Galloway .............. F16L 37/36 251/89.5 |
| 4,280,723 | A | * | 7/1981 | Moldestad ............ F16L 37/113 285/376 |
| 4,429,713 | A | * | 2/1984 | Walter .................. F16L 37/34 251/149.8 |
| 4,986,304 | A | * | 1/1991 | Vanderjagt ............ F16L 37/32 137/614.2 |
| 5,009,252 | A | * | 4/1991 | Faughn ................. F16L 37/32 285/91 |
| 5,211,197 | A | * | 5/1993 | Marrison .............. F16L 37/35 251/149.6 |
| 5,320,326 | A | * | 6/1994 | Ju ........................ F16L 37/0915 251/149.6 |
| 5,884,648 | A | * | 3/1999 | Savage ................. F16L 37/36 137/614.04 |
| 5,971,019 | A | * | 10/1999 | Imai ..................... F16L 37/35 285/914 |
| 6,161,578 | A | * | 12/2000 | Braun ................... F16L 37/35 137/614.04 |
| 7,762,278 | B2 | * | 7/2010 | Adams ............. H01M 8/04201 137/550 |
| 8,746,278 | B2 | * | 6/2014 | Py ........................ F16L 37/36 251/340 |
| 9,291,293 | B2 | * | 3/2016 | Prust .................... F16L 37/35 |
| 9,708,173 | B2 | * | 7/2017 | Ballard ................. B67D 7/42 |
| 9,863,566 | B2 | * | 1/2018 | Tiberghien ........... F16L 37/36 |
| 9,909,703 | B2 | * | 3/2018 | Van Scyoc ........... F16L 37/32 |
| 10,253,911 | B1 | * | 4/2019 | Quang ................. F16L 37/123 |
| 10,415,734 | B2 | * | 9/2019 | Imoto ................... F16L 37/23 |
| 10,767,802 | B2 | * | 9/2020 | Hasunuma ............ H05F 3/02 |
| 10,865,928 | B2 | * | 12/2020 | Readman ............. F16L 37/096 |
| 2009/0261577 | A1 | * | 10/2009 | Readman ............. F16L 37/40 285/99 |
| 2017/0191595 | A1 | | 7/2017 | Van Scyoc |

* cited by examiner

CONNECTION UNITS FOR QUICK CONNECTION/DISCONNECTION FLUIDIC LINES

CROSS-REFERENCE TO RELATED APPLICATIONS

This patent application is a 35 U.S.C. § 371 National Stage filing of International Application No. PCT/IB2021/055970, filed on Jul. 2, 2021, which application claims priority from European patent application no. 20184051.9 filed on Jul. 3, 2020 and Italian patent application no. 10202000022447 filed on Sep. 3, 2020, the entire disclosures of which are incorporated herein by reference.

TECHNICAL FIELD OF THE INVENTION

The present invention relates to a connection unit for quick connection/disconnection fluidic lines.

The present invention has an advantageous, although not exclusive, application in the aerospace sector, and in particular in the connection of fluidic lines in space stations, which will be referred to below without losing generality.

The present invention may also be applied in various non-space sectors, such as the connection of fluidic lines in terrestrial installations, aircraft or ships, whenever the problem of connecting circuit branches under pressure between them arises.

BACKGROUND OF THE INVENTION

The connection between two branches of a fluidic line is normally made by means of a connection unit formed by a male and a female connector that can be coupled together.

In space missions, for example in the missions leading up to the International Space Station being realised, the problem of making a fluidic connection between two circuit branches, at least one of which is pressurised before connection, frequently arises.

For this purpose, connection units are used whose male and female connectors are capable of constituting a sealing termination of the respective circuit branch are used. The male and female connectors are internally provided with movable sealing elements designed to provide a static seal when the connectors are disconnected, and to interact with each other when they are connected to provide a fluidic continuity between the lines.

Making a seal inside a female connector by means of a movable sealing element that can retract when coupling with the male connector is relatively simple, whereas making a movable sealing element inside a male connector is generally more complex and requires expensive technical solutions and high precision machining.

GB607340 describes a solution in which the male connector consists of a double-male connection element permanently coupled to a female connection element; when the male connector is inserted into the female connector, an immediate fluidic connection is established between the two connectors.

In a known solution, the coupling between the male connector and the female connector is made by means of a ring nut coaxial to the male connector and which can be coupled to the female connector by means of a threaded connection requiring several turns of the ring nut for connection. This means that the connection cannot be made through a robotic arm.

OBJECT AND SUMMARY OF THE INVENTION

The present invention therefore has the aim of providing a connection unit which solves the above problems.

According to the present invention, a connection unit as claimed in the appended claims is realised.

BRIEF DESCRIPTION OF THE DRAWINGS

For a better understanding of the present invention, a preferred embodiment is described below, by way of non-limiting example and with reference to the accompanying drawings, wherein.

DETAILED DESCRIPTION OF PREFERRED EMBODIMENTS OF THE INVENTION

The present invention will now be described in detail with reference to the accompanying Figures to enable a skilled person to realize and use it. Various modifications to the embodiments presented shall be immediately clear to persons skilled in the art and the general principles disclosed herein could be applied to other embodiments and applications but without thereby departing from the scope of protection of the present invention as defined in the appended claims. Therefore, the present invention should not be considered limited to the embodiments described and shown but should be granted the widest protective scope in accordance with the features described and claimed.

In order to facilitate understanding of the embodiments described herein, reference will be made to some specific embodiments and a specific language will be used to describe them. The terminology used herein is for the purpose of describing only particular embodiments, and is not intended to limit the scope of the present invention.

Figure 1:
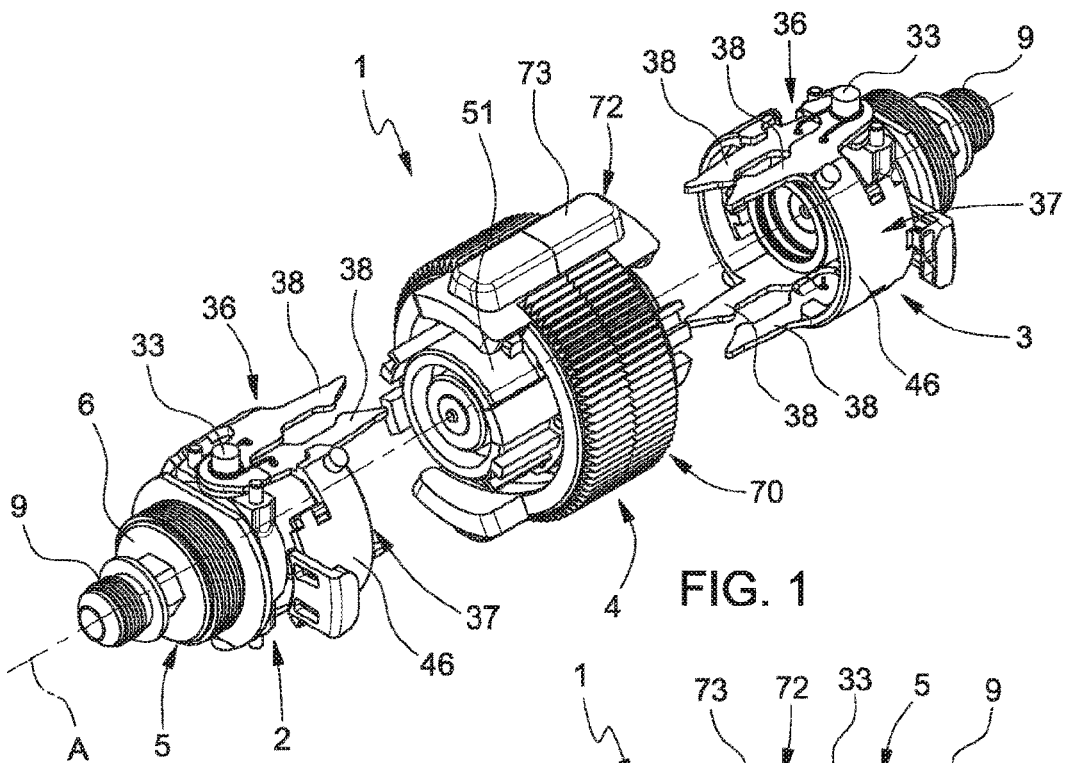
FIGS. 1, 2 and 3 are perspective views of the connection unit in different operating positions.
Figure 2:
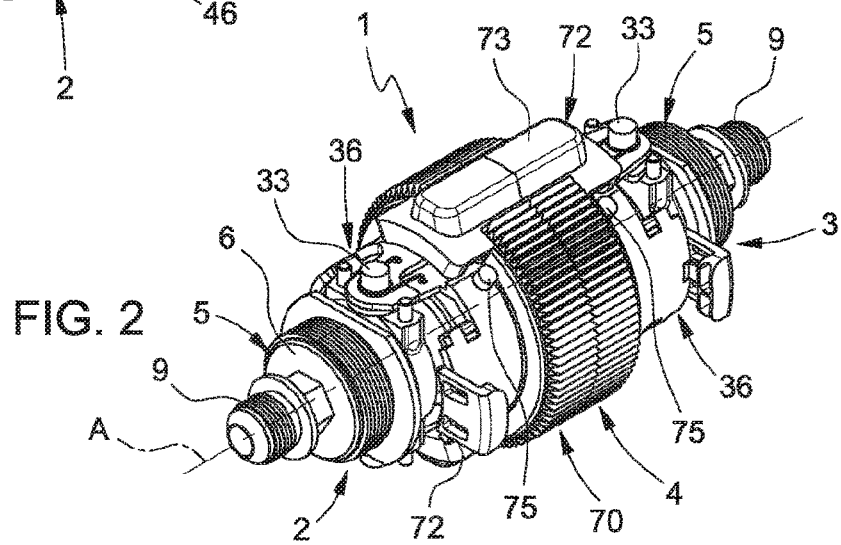
Figure 3:
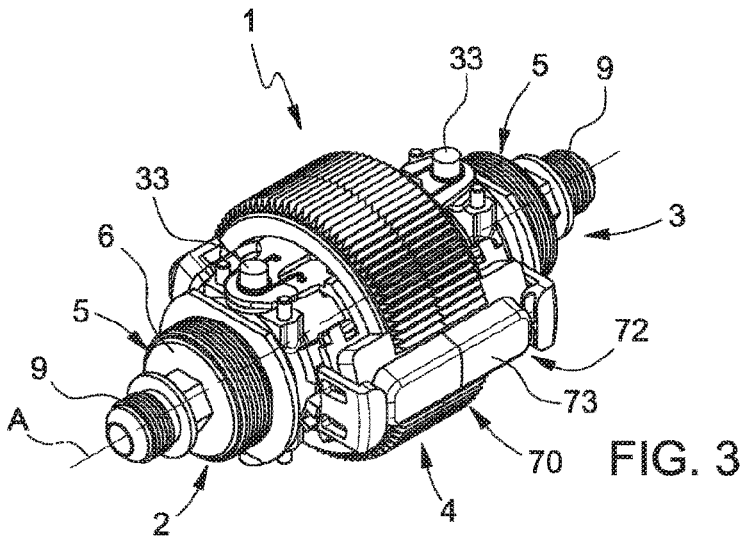

With reference to FIGS. 1 to 3, 1 denotes as a whole a connection unit for fluidic lines realized according to the invention. The unit 1 is shown in a disconnection configuration (i.e. broken down into its elements) in FIG. 1, in a mechanical pre-connection configuration in FIG. 2 and in a mechanical and fluidic connection position in FIG. 3.

The unit 1, of axis A, essentially comprises a first connector 2, a second connector 3 and a coupling element 4 interposed between the connectors 2 and 3.

The connectors 2, 3 are both of the female type and are identical to each other. The following description, which refers to the connector 2, therefore also applies to the connector 3.

The connector 2 (visible in greater detail in FIGS. 4 and 8 to 10) comprises a nipple 5 provided with a cup-shaped body 6 defining within it a cylindrical cavity 7 delimited axially by a flat annular intermediate wall 8 and with a threaded tubular fitting 9 extending axially cantilevered from the intermediate wall 8 and defining a conduit 10 leading into the cavity 7.

The thread of the fitting 9 is designed for fluidic connection of the connector 2 to a respective branch of a fluidic circuit not shown. This branch may consist of an apparatus, for example a pump, a compressor or a utility of any nature, or a fluidic line, for example a pneumatic conduit or a pipeline for transporting a liquid, for example water, hydraulic oil, gas or in general fluids of any nature, including organic.

The cup-shaped body 6 has an external thread 11 designed to allow the mechanical connection with a fixed bulkhead (not shown), through which the connector 2 can be mounted passing through. The bulkhead may consist of a wall or a panel forming part of an apparatus.

The connector 2 (FIGS. 4, 9 and 10) further includes a distributor 14 in the form of a cylindrical disc housed in the cavity 7 of the nipple 5 and a body 15 partially housed in the cavity 7, in axial contact with the distributor 14. The distributor 14 and the body 15 define a plurality of channellings 16 for the fluid of complex shape, in order to minimise pressure losses, and are conveniently obtained by means of an additive manufacturing technique (3D printing). These channellings 16 are clearly visible in FIG. 11, where the parts of the connection unit 1 are shown in transparency.

Figure 9:
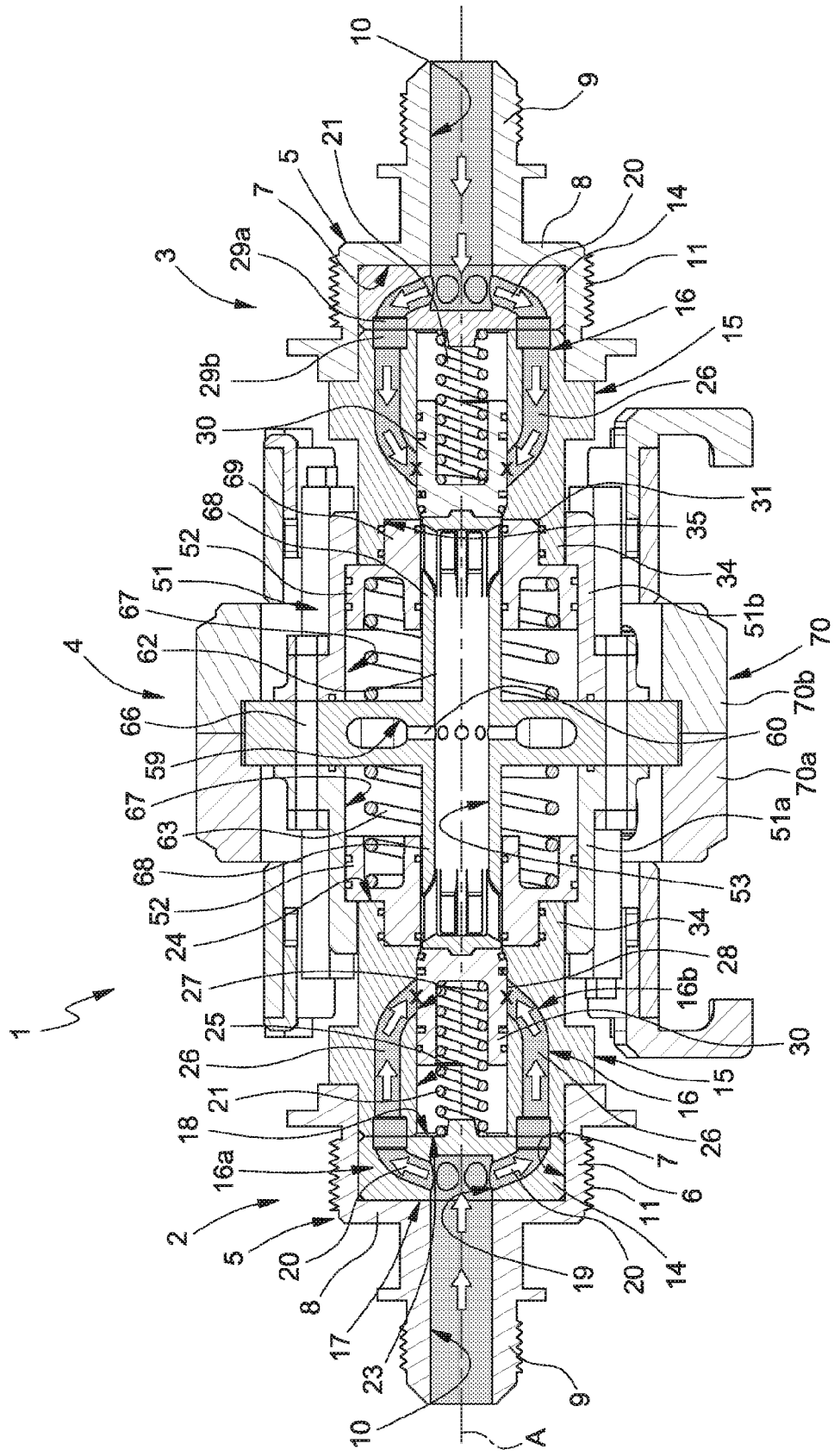
FIG. 9 is an axial section of the connection unit in the operating position of FIGS. 2 and 8.
Figure 10:
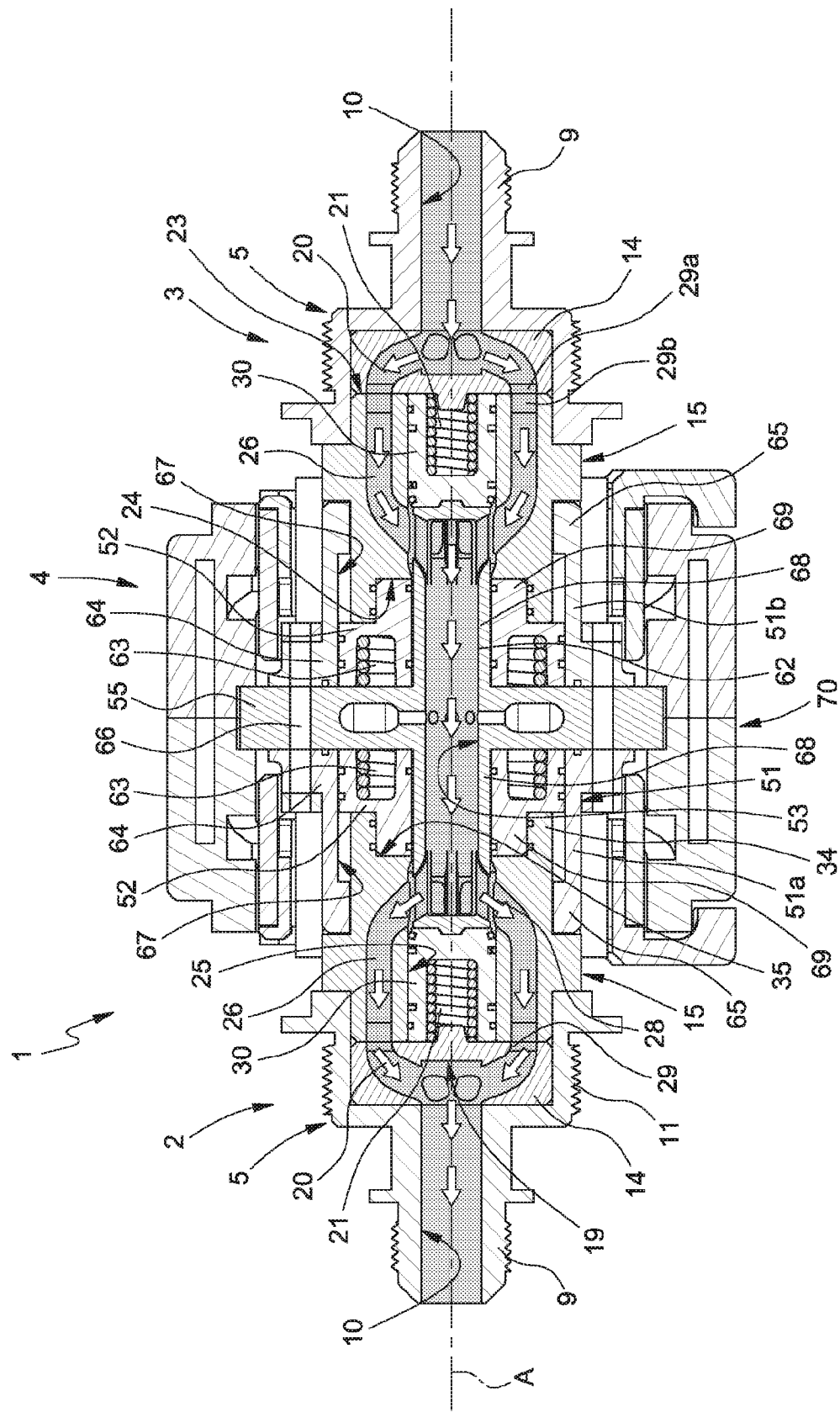
FIG. 10 is an axial section of the connection unit in the operating position of FIG. 3.
Figure 11:
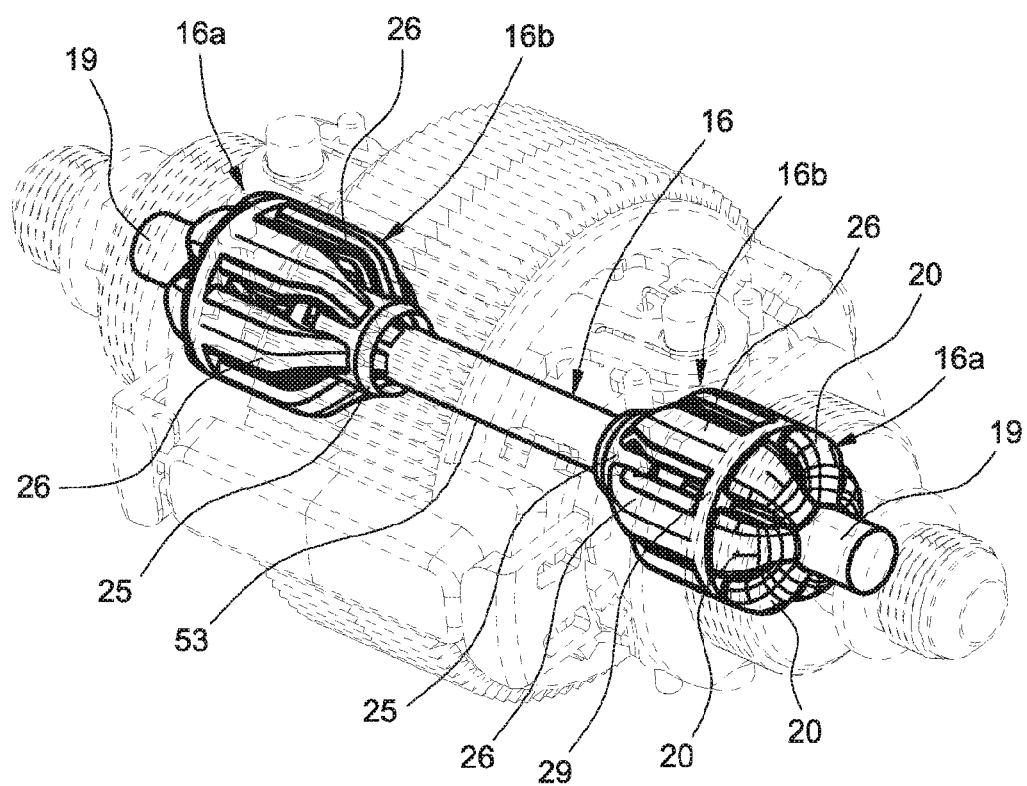
FIG. 11 is a perspective view of the connection unit in the operating position of FIGS. 3 and 10, with parts shown in transparency for greater clarity.

More specifically, the distributor 14 has a first flat face 17 placed in axial contact with the intermediate wall 8 and a second flat face 18 placed in axial contact with the body 15 (FIGS. 9 and 10). The part 16a of the channellings 16 realized in the distributor 14 comprises a central chamber 19 directly facing the conduit 10 and a plurality of conduits 20 extending radially in a radial pattern from the chamber 19 and lead axially on the second face 18. The chamber 19 is closed towards the second face 18 (FIG. 11).

The body 15, substantially cylindrical in shape, has a first base face 23 arranged in axial sealing abutment with the second face 18 of the distributor 14 and a second opposite base face 24.

The part 16b of the channellings 16 realized in the body 15 comprises an axial through conduit 25 and a plurality of conduits 26 which lead axially on the first face 23 at the conduits 20 and extend radially in a radial pattern towards an end zone 27 of the conduit 25 opposite the first face 23, into which they open forming openings 28.

Conveniently, at the exit holes of the conduits 20 and 26, on the respective faces 18, 23 of the distributor 14 and of the body 15, respective annular grooves 29a, 29b are obtained which match axially to form an annular channel 29 (FIG. 11) which fluidically connects the conduits 20 and 26 to each other.

In the conduit 25 there is sealingly housed a piston 30 axially slidable between an advanced position (FIG. 9) in which it occupies the end zone 27 of the conduit 25 and therefore closes the exit openings 28 of the conduits 26, and a retracted position (FIG. 10) adjacent to the distributor 14. The advanced position of the piston 30 is defined by the contact between the piston and an inner annular projection 31 at the end of the conduit 25, and is maintained by a spring 21 housed in the conduit 26 between the distributor 20 and the piston 30.

Finally, the body 15 comprises a substantially quadrangular flange 32 extending radially from an outer surface of the body in proximity to the first face 23. Two cylindrical pins 33 coaxial to each other extend in a radial direction on opposite sides of the flange 32.

Finally, the body 15 has an annular projection 34 extending axially from an outer edge of the second face 24 and delimiting a cylindrical seat 35 for coupling with the coupling element 4, as described below.

Figure 4:
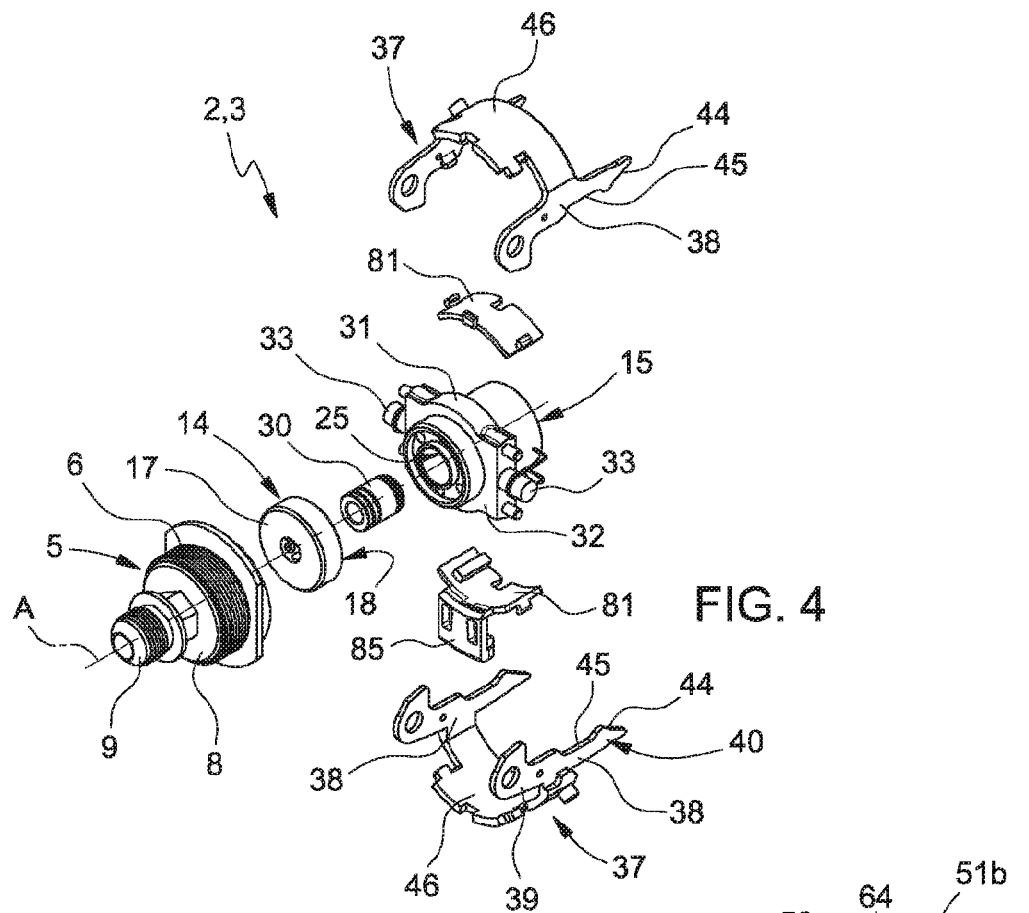
FIG. 4 is an exploded perspective view of a female connector of the connection unit of the previous figures.
Figure 8:
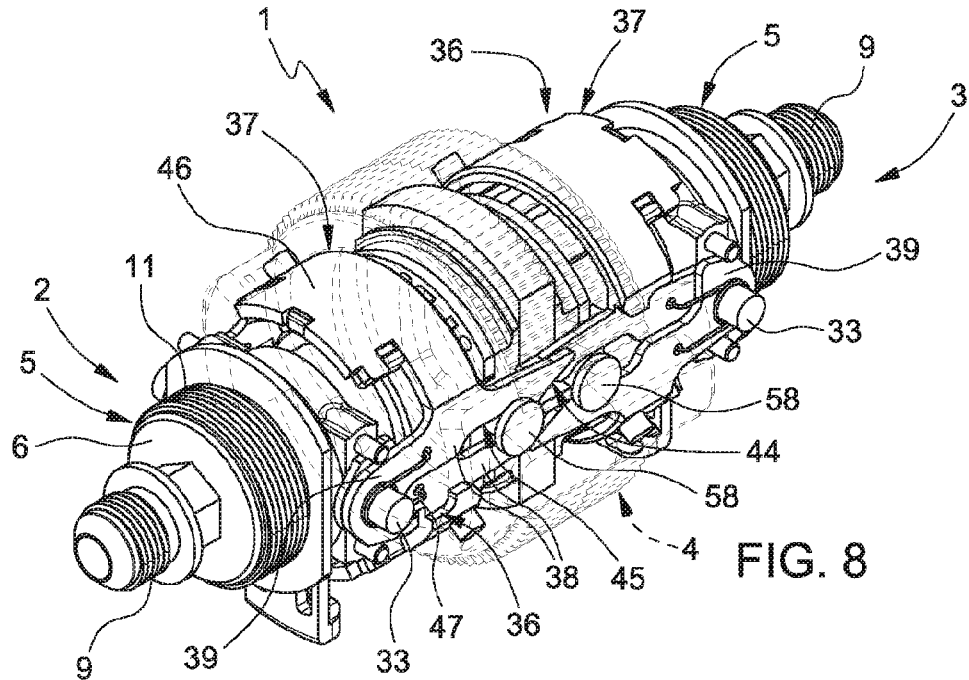
FIG. 8 is a view corresponding to the views in FIG. 2, with parts shown in transparency for greater clarity.

The connector 2 is also provided with a pre-coupling clamp 36 visible in FIGS. 4 and 8.

The clamp 36 comprises two jaws 37 hinged around their respective pins 33. Each of the jaws 37 comprises a pair of blades 38 extending axially on opposite sides of the body 15 and having a proximal end 39 hinged to the respective pin 33 and a distal end 40.

The blades 38 (FIG. 8) comprise, on their longitudinal sides facing each other, respective lead-in chamfers 44 diverging towards the distal ends 40, and respective axially elongated intermediate recesses 45 facing each other.

The jaws 37 further comprise respective connection plates 46 which integrally connect respective outer intermediate zones of the blades 38 of each jaw to each other and are arched so as to extend around the body 15.

The jaws 37 are loaded by springs 47 (FIG. 8) wound around the respective pins 33 and tending to keep them in a closed position.

With reference to FIGS. 5 and 8-10, the coupling element 4 comprises a double-male connector 50 separable from the female connectors 2, 3, a body 51 enclosing the connector 50, and a pair of pistons 52 sliding within the body 51.

Figure 5:
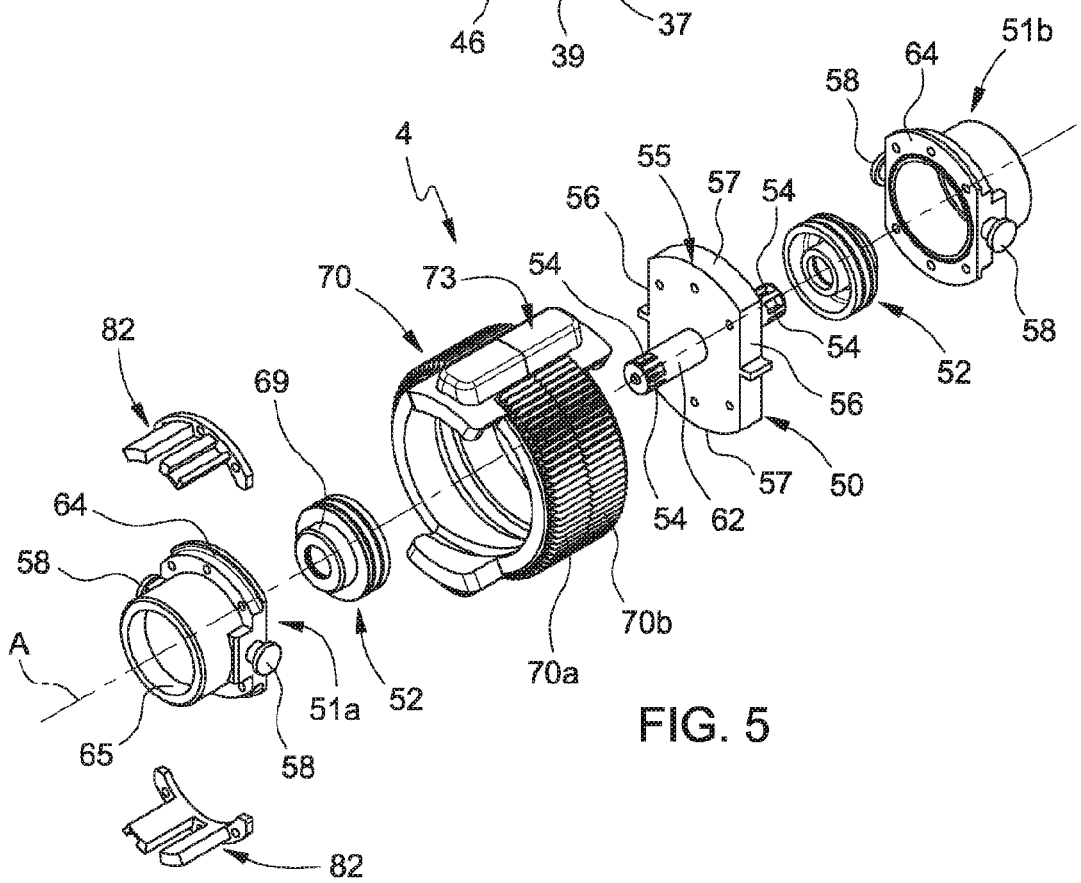
FIG. 5 is an exploded perspective view of a coupling element of the connection unit of FIGS. 1-3.

More particularly, the connector 50 comprises an axial tubular element 62, of elongated cylindrical shape, defining in its inside a central axial conduit 53 closed at the ends. In proximity to its opposite axial ends, the tubular element 62 has a plurality of radial openings 54 extending in a radial pattern from and communicating with the conduit 53 (FIG. 5). The openings 54 correspond in number and spatial arrangement to the exit openings 28 of the conduits 26 in the central conduit 25 of the body 15, as will be further explained below.

The connector 50 further comprises an intermediate plate 55, extending radially and integrally from the tubular element 62 in a plane orthogonal to the axis A and having a substantially quadrangular shape (FIG. 5) with two flat sides 56 and two sides 57 that are curved two by two and opposite. The plate 55 divides the tubular element 62 into two cylindrical shanks 68, each of which functions as a male connection element designed to couple with a respective female connector 2, 3.

The plate 55 is provided with a plurality of blind radial chambers 59 fluidically connected to the central conduit 53 by radial passages 60.

The body 51 is divided into two substantially cylindrical parts 51a, 51b, each having at their opposite ends, an outer flange 64 and an inner annular projection 65 (FIG. 10). The flanges 64 rest on respective opposite faces of the plate 55 and are fixed to each other by means of a plurality of screws 66 passing through the plate 55 (FIGS. 9, 10), thus forming the body 51. The body 51 defines with the tubular element 62 a pair of annular chambers 67, arranged on axially opposite sides of the plate 55. The pistons 52 are housed sealingly and slidably in the respective chambers 67 and have, on one end opposite the plate 55, an annular end projection 69 designed to cooperate with the respective body 15 by being sealingly housed in the corresponding cylindrical seat 35 of the body. The pistons 52 are normally kept in contact with the inner annular projections 65 of the body 51 by respective springs 63 housed in the annular chambers 67.

From the flange 64 of each half 51a, 51b of the body 51, two radially opposed rungs 58 extend radially outwards, the function of which will be clarified below.

All sliding seals are realized by means of sealing rings, and are preferably redundant. i.e. they include two sealing rings in series along each path of possible leakage. A detailed description of the sealing rings and of their position is considered superfluous, as it is within the reach of a person skilled in the art.

Figure 7:
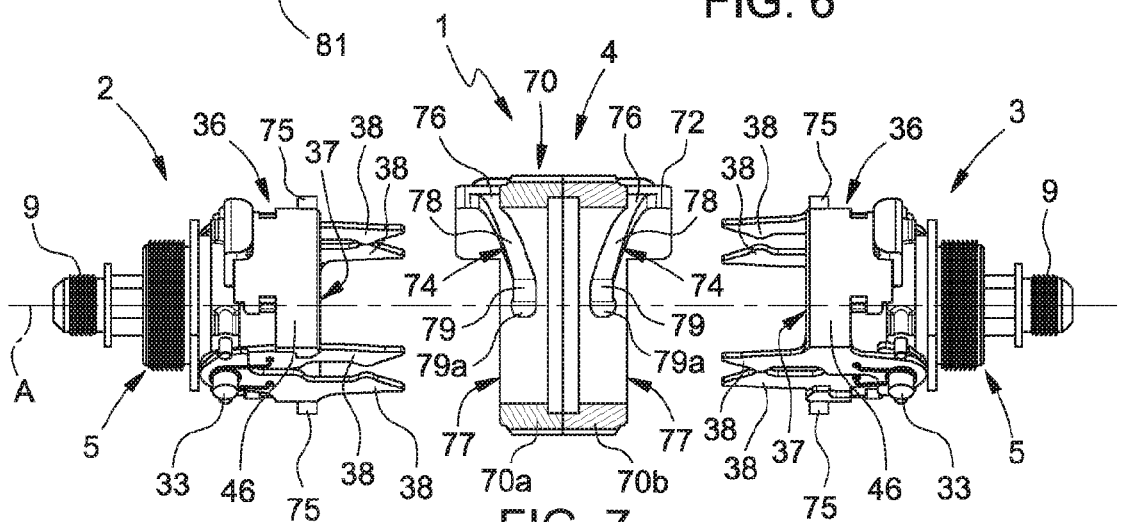
FIG. 7 is a side view and partial section of the connection unit in a position corresponding to the view in FIG. 1, with parts removed for clarity's sake.

Finally, the coupling element 4 comprises an external annular ring 70 coaxial to the body 50 and formed by two parts 70a. 70b enclosing the plate 55, which is rotatably housed within an internal groove 71 formed by the two parts 70a, 70b once joined together (FIG. 7). The ring 70 has two diametrically opposite projections 72, each of which extends axially on both sides and forms on its own outer surface a substantially elongated rectangular area 73 on which identification marks may be printed or affixed in any way, as will be further described below.

The ring nut 70, as can be seen in particular from FIG. 5 and FIG. 7 (in which all parts of the coupling element 4 are omitted for clarity's sake), has within it ramp-like grooves 74 designed to cooperate with respective rungs 75 carried by the jaws 37 of the clamps 36 to form respective bayonet couplings between the coupling element 4 and each of the connectors 2, 3.

More particularly, the rungs 75 radially extend in positions that are diametrically opposite between them from the respective jaws 37 of the clamp 36 of each connector 2, 3 when the clamp 36 is in the closed position, as will be better described below.

The grooves 74 inside the ring nut 70 (only two of which are visible in FIG. 7) extend circumferentially for 90° and have a circumferential entry opening 76, arranged at a side of a respective projection 71 and in proximity to a front face 77 of the ring nut, a ramp-like portion 78 extending towards the centre of the ring nut 50 and a substantially circumferential blind end portion 79 with an end 79a defining a slight recess turned axially towards the respective connector 5.

Finally, the connection unit 1 includes a key system 80 designed to prevent the wrong coupling between connectors belonging to different fluidic lines. The key system 80, visible in detail in FIGS. 4 to 6, consist of a pair of keys 81 carried by each female connector 2, 3, and of corresponding pairs of keys 82 carried by the coupling element 4 and designed to couple axially with the respective keys 81 at the time of coupling between the connectors 2, 3 and the coupling element 4.

The keys 81, 82 are interchangeable and uniquely identify the line to which the connection unit belongs; in other words, the keys 81, 82 constitute a "code" associated with a specific line.

Figure 6:
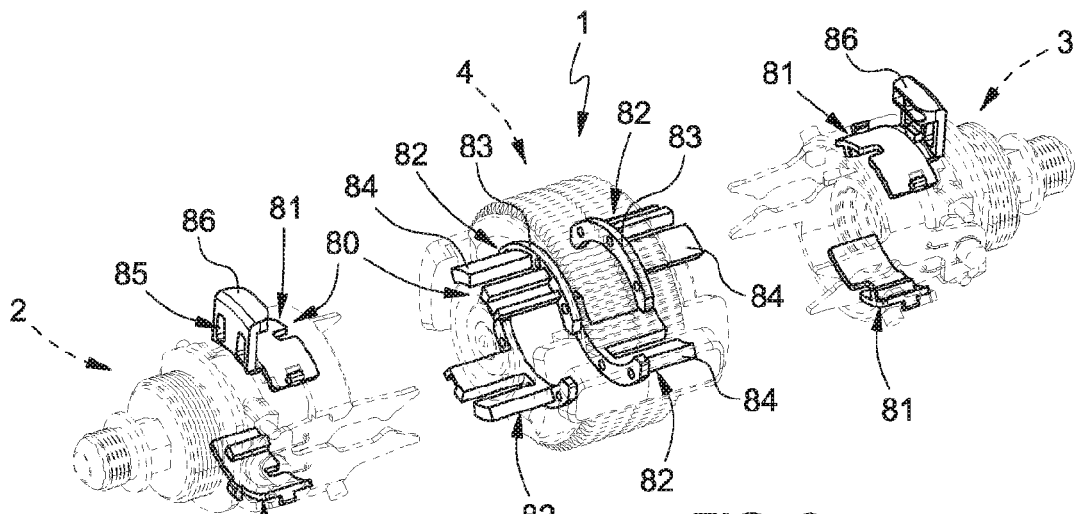
FIG. 6 is a view corresponding to the views in FIG. 1, with parts shown in transparency for greater clarity.

More specifically, with reference to FIG. 6, the keys 81 may be shaped plates mounted interlockingly within the connection plates 46 of the jaws 37, while the keys 82 may comprise a base 83 designed to be fixed frontally on the respective flange 64 of the body 51 of the coupling element 4 and a plurality of axial projections 84 extending cantilevered from the base 83. The projections 84 and the keys 81 have complementary shapes to allow a sliding axial coupling.

Conveniently, at least one of the keys 81 of each connector 2, 3 has an outer radial projection 85 terminating in an axially folded appendage 86, the function of which will be clarified below.

The operation of the connection unit 1 is as follows.

In FIGS. 1, 6 and 7 the unit is shown in the disconnection position, where both connectors 2, 3 are separated from the coupling element 4.

In this condition, the connectors 2, 3 sealingly close the respective branches of the fluidic circuit. In fact, the springs 21 keep the pistons 30 in the end-of-stroke position shown in FIG. 9 in which they occupy the end zone 27 of the respective conduits 25 and close the exit openings 28 of the conduits 26.

By bringing the connectors 2, 3 axially closer to the coupling element 4, which are suitably aligned with each other axially and circumferentially, the keys 81, 82 interact with each other. If the connection is incorrect, i.e. if the keys 81, 82 do not match, the connection is prevented by the frontal impact between the keys. This impact generates a torque on the jaws 37 around the pins 33 in the direction of the opening of the jaws, so that any further axial approach between the connectors 2, 3 and the coupling element 4 is prevented and the connection is impossible.

If the connection is correct, i.e. the keys 81, 82 correspond to each other, the keys 81, 82 can interpenetrate axially and allow the coupling stroke to continue, until the jaws 37 of the clamps 36 of the connectors 2, 3 contact the respective rungs 58 of the coupling element 4. The latter are wedged between the chamfers 44 of the blades 38 causing them to open against the action of the springs 47. When the rungs 58 engage the recesses 45, the jaws 37 snap close under the thrust of the springs 47, resulting in a mechanical pre-coupling condition between the connectors 2, 3 and the coupling element 4 (FIGS. 2, 8 and 9).

Note that the recesses 45 are axially elongated, so as to allow a further axial approach between the connectors 2, 3 and the coupling element 4 from the pre-coupling condition.

It should also be noted that this condition results in a mechanical but not fluidic connection. In fact, with specific reference to FIG. 9, in this mechanical pre-coupling condition, the bodies 15 of the connectors 2, 3 come into axial contact with the pistons 52 of the coupling element 4, whose projections 34 engage the respective seats 35, but the pistons 52 remain in the end-of-stroke position in contact with the projections 65 and therefore keep the openings 54 closed. Furthermore, the pistons 30 of the connectors 2, 3 are in axial contact with the opposite ends of the tubular element 62 but remain in the end zone 27 of the conduits 29, thus keeping the openings 28 closed.

In order to realize a fluidic seal, the ring nut 70 must be turned by 90° bringing it from the position shown in FIG. 2 to the one in FIG. 3.

As can be noted from FIG. 2, in the pre-coupling positions, the rungs 75 of the jaws 37 of the connectors 2, 3 face circumferentially with the entry openings 76 of the ramp-like grooves 74 of the coupling element 4. By turning the ring nut 70, the rungs 75 enter the respective grooves 74 and run through them until they reach the ends 79a, where they are blocked. Due to the ramp shape of the grooves 74, this results in an axial displacement of the connectors 2, 3 towards the inside of the coupling element 4.

In particular, with reference to FIG. 10, the ends of the tubular element 62 axially penetrate inside the central conduits 25 of the bodies 15 of the connectors 2, 3, axially displacing the pistons 30 against the action of the springs 21. The pistons 28 therefore uncover the openings 28.

At the same time, the pistons 52 of the coupling element 4, due to the axial contact with the bodies 15 of the connectors 2, 3, retract towards the plate 55 in the respective chambers 67, against the action of the springs 53. In this way, the pistons 52 uncover the openings 54, which are located at the openings 28. A connection is therefore established between the conduits 26 of the connectors 2, 3 and the central conduit 53 of the tubular element 52, as can be clearly seen in FIG. 11 where these conduits are highlighted.

Once the unit is connected, the projections 71 of the ring nut 70 are aligned with the appendages 86 of the keys 81, visually confirming the completion of the connection. Where an automatic handling of the unit is envisaged, a code, for example a bar code, may be affixed partly to the projections 71 and partly to the associated ones 86. In this way, the code is completed and can only be read after successful connection.

In the above description, the unit has been shown for clarity's sake as formed by three elements (the connectors 2, 3 and the coupling element 4) initially disconnected and separated from each other. In practice, in use the coupling element 4 is conveniently pre-mounted on one of the two female connectors 2, 3. i.e. mechanically connected to this connector in the described pre-coupling position. The connection of the unit 1 will therefore involve the connection of two sub-units, one constituted by the set of a first connector (e.g. The connector 2) and of the coupling element 4 and the other one by the second connector 3. This connection will therefore involve an initial pre-coupling phase of the connector 3, and a fluidic connection phase by rotation of the ring nut 70.

From an examination of the characteristics of the connection unit 1 realized according to the present invention, the advantages that it allows to obtain are evident.

Firstly, the use of two female connectors 2, 3 designed for connection to respective circuit branches and of a double-male coupling element that does not fluidically communicate with either of the aforesaid branches before connection enables the structure to be greatly simplified, while reliably achieving the seal on the two circuit branches before connection. This results in a low overall cost and high reliability of the connection unit.

Another advantage of the unit is the simplicity of the movements required for connection, which include a rotation of a fraction of a revolution, in the example shown 90°. As a result, the connection of the unit can be easily realized by using automatic manipulators.

A further advantage is the inhibition of the connection if the keys of the connectors and the coupling element do not match.

Further assurance of the reliability of the connection is provided by the display of the alignment between one of the projections 71 of the ring nut 70 with the appendages 86 of the keys 81, and by the possibility of using this alignment to form a machine-readable code.

Finally, the presence of a compensation volume (constituted in the example shown by the chambers 59 in the plate 55) connected in derivation to the fluid path in the unit allows the absorption, at least in part, of possible pressure waves (water hammer) due to the sudden connection of branches of the circuit placed at different pressures.

Finally, it is clear that changes and variations can be made to the unit 1 described that do not go beyond the scope of protection defined by the claims.

In particular, the bayonet coupling between the coupling element 4 and the connectors 2, 3 can be replaced by another type of mechanism, provided that the passage from the pre-coupling condition to the fluidic connection condition can be realized by means of an elementary movement of a control element, for example by rotation of a fraction of a revolution or a translation, so as to allow the realization of the connection by means of a robotic arm.

The ring nut 70 can therefore be replaced by a control element of different type. e.g. a lever.

The specific realization of the sealing elements within the connectors 2, 3 and the coupling element 4 may be different.

The chambers 59 can be replaced or integrated by compensation volumes arranged in other parts of the connection unit, e.g. in the connectors 2, 3.

The invention claimed is:

1. A connection unit including a first and a second connector (2, 3) configured to be connected to respective circuit branches of a fluidic line and a coupling element (4) for coupling said connectors (2, 3) together and establish a fluidic connection between said circuit branches, said connectors (2, 3) being provided with first, normally closed sealing elements (30) to define a sealing termination of said circuit branches when the connectors (2, 3) are disconnected from each other;
   both said connectors are female connectors (2, 3);
   the coupling element (4) includes a double-male connector (50) separable from the female connectors (2, 3) and provided with a pair of shanks (68) that can be coupled to the respective female connectors (2, 3) and a control element (70) movable between a first position where the coupling element (4) can be coupled to the connectors (2, 3) in a mechanical pre-coupling condition without fluidic connection between the female connectors (2, 3) and a second position where the shanks (68) of the double-male connector (50) engage the respective female connectors (2, 3) and establish the fluidic connection therebetween.

2. The connection unit as claimed in claim 1, including a mechanism configured to axially move the connectors (2, 3) closer to the coupling element (4) in response to the movement of the control element (70) between the first and second position.

3. The connection unit as claimed in claim 2, wherein said control element is a ring nut (70) and said mechanism is a bayonet coupling (74; 75).

4. The connection unit as claimed in claim 3, wherein the connectors (2, 3) and the ring nut (70) have respective visual indicia (86, 71) aligned with each other in the second position of the ring nut (70).

5. The connection unit as claimed in claim 4, wherein the visual indicia (86, 71) define together a machine readable code.

6. The connection unit as claimed in claim 1, wherein the motion of the control element (70) from the first to the second position is a rotation of amplitude equal to a fraction of a revolution.

7. The connection unit as claimed in claim 1, wherein the connectors include a nipple for connection to the respective circuit branch and defining a first conduit (10) communicating fluidly, in use, with the respective circuit branch, and a second conduit (25) that can be engaged by a respective shank (68) of the double-male connector (50), said first and second conduit (20; 25) being connected by at least one channel (20, 26) leading into the second conduit (25) through at least one radial opening (28), said first sealing elements of the female connectors (2, 3) including a piston (30) housed slidably in the second conduit and movable under the thrust of the respective shank (68) to uncover said at least one opening (28).

8. The connection unit as claimed in claim 7, wherein the shanks (68) of the double-male connector (50) are closed at their ends and have at least one radial opening (54) designed to match the at least one opening of the respective connector (2, 3).

9. The connection unit as claimed in claim 8, wherein the coupling element (4) includes second sealing elements (52) slidable on the respective shanks (68) and selectively cooperating sealingly with said at least one radial opening (54), said second sealing elements (52) being movable upon contact with the respective female connectors (2, 3) to uncover said at least one radial opening (54) when the shanks (68) engage the respective second conduits (25).

10. The connection units as claimed in claim 1, wherein the connectors and the coupling element include respective keys (81, 82) corresponding to a given fluidic line, said keys (81, 82) being configured to prevent coupling between the connectors (2, 3) and the coupling element (4) in case of attempted connection of circuit branches belonging to different fluidic lines.

11. The connection unit as claimed in claim 1, wherein the mechanical pre-coupling position is defined by the elastic coupling between a clamp (36) carried by one of the connectors (2, 3) and at least one rung carried by the coupling element (4), or vice versa.

12. The connection unit as claimed in claim 11, wherein the keys (81, 82) are configured to prevent the clamp (36) from closing in case of incorrect connection.

13. The connection unit as claimed in claim 1, wherein at least one of the connectors (2, 3) and the coupling element (4) includes at least one compensation volume (59).

* * * * *